United States Patent
Shen et al.

(10) Patent No.: US 12,394,021 B2
(45) Date of Patent: Aug. 19, 2025

(54) DEPTH-BASED SEE-THROUGH PREVENTION IN IMAGE FUSION

(71) Applicant: INNOPEAK TECHNOLOGY, INC., Palo Alto, CA (US)

(72) Inventors: Jinglin Shen, Palo Alto, CA (US); Kim C. Ng, Palo Alto, CA (US); Jinsong Liao, Palo Alto, CA (US); Chiuman Ho, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 363 days.

(21) Appl. No.: 18/315,217

(22) Filed: May 10, 2023

(65) Prior Publication Data
US 2023/0274403 A1    Aug. 31, 2023

Related U.S. Application Data

(63) Continuation of application No. PCT/US2021/021379, filed on Mar. 8, 2021.
(Continued)

(51) Int. Cl.
*G06T 5/50* (2006.01)
*G06T 3/40* (2006.01)

(52) U.S. Cl.
CPC ............ *G06T 5/50* (2013.01); *G06T 3/40* (2013.01); *G06T 2207/10024* (2013.01);
(Continued)

(58) Field of Classification Search
CPC ... G06T 5/50; G06T 3/40; G06T 2207/10024; G06T 2207/10048; G06T 2207/20016;
(Continued)

(56) References Cited

U.S. PATENT DOCUMENTS 10,156,937 B2 * 12/2018 Tretter .................. G06T 7/13
11,546,567 B2 *  1/2023 Collet Romea ...... H04N 13/106
(Continued)

FOREIGN PATENT DOCUMENTS

KR    20120051213    5/2012

OTHER PUBLICATIONS

Lex Schaul et al., "Color Image Dehazing Using the Near-Infrared", 2009. (Year: 2009).*
(Continued)

*Primary Examiner* — Phuoc Tran
(74) *Attorney, Agent, or Firm* — Hodgson Russ LLP

(57) ABSTRACT

This disclosure is directed to image fusion. A computer system obtains a near infrared (NIR) image and an RGB image of a scene. A first NIR image layer is generated from the NIR image. A first RGB image layer and a second RGB image layer are generated from the RGB image. The first NIR image layer and first RGB image layer have a first resolution. A depth map is also generated and has the first resolution. Each pixel of the first NIR image layer and a corresponding pixel of the first RGB image layer are combined based on a respective weight to generate a first combined image layer used to reconstruct a fused image. For each pair of pixels of the first NIR and RGB layers, the respective weight is determined based on a depth value of a respective pixel of the depth map and a predefined cutoff depth.

20 Claims, 11 Drawing Sheets

Related U.S. Application Data

(60) Provisional application No. 63/113,624, filed on Nov. 13, 2020, provisional application No. 63/113,168, filed on Nov. 12, 2020.

(52) U.S. Cl.
CPC .............. *G06T 2207/10048* (2013.01); *G06T 2207/20016* (2013.01); *G06T 2207/20221* (2013.01)

(58) Field of Classification Search
CPC . G06T 2207/20221; G06T 2207/20081; G06T 2207/20084; G06T 7/55
See application file for complete search history.

(56) References Cited

U.S. PATENT DOCUMENTS

| | | |
|---|---|---|
| 2015/0015569 A1 | 1/2015 | Jung et al. |
| 2015/0125092 A1 | 5/2015 | Zhuo et al. |
| 2017/0109870 A1 | 4/2017 | Park et al. |

OTHER PUBLICATIONS

WIPO, International Search Report and Written Opinion for PCT/US2021/021379, Aug. 2, 2021.
Ji et al., "Fusing Depth and Silhouette for Scanning Transparent Object with RGB-D Sensor," International Journal of Optics, 2017.

\* cited by examiner

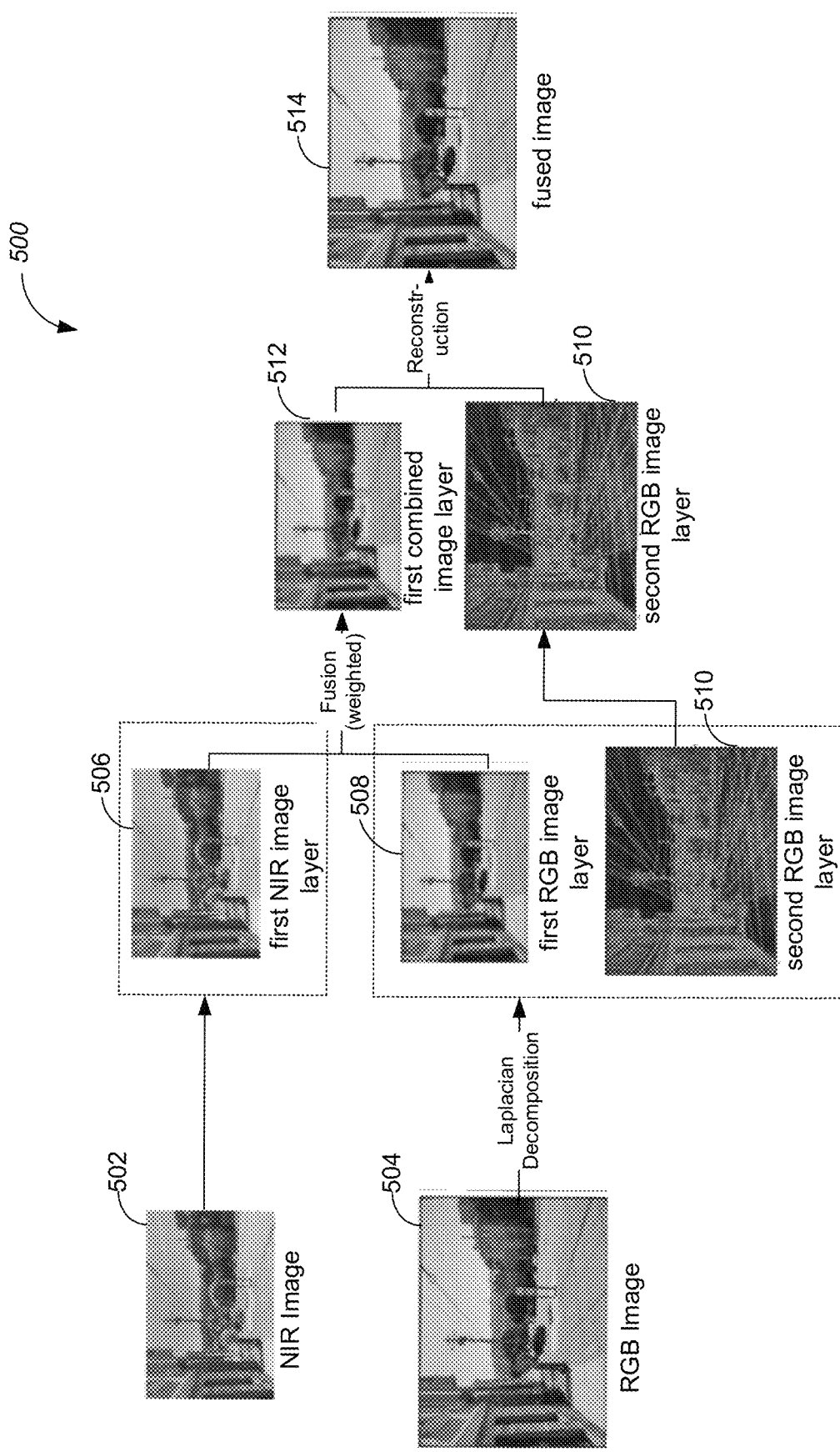

DEPTH-BASED SEE-THROUGH PREVENTION IN IMAGE FUSION

RELATED APPLICATIONS

This disclosure is a continuation of International Application No. PCT/US2021/021379, filed Mar. 8, 2021, which claims priority to U.S. Provisional Patent Application No. 63/113,168, filed Nov. 12, 2020, and U.S. Provisional Patent Application No. 63/113,624, filed Nov. 13, 2020, the entire disclosures of the above-mentioned applications are incorporated herein by reference.

TECHNICAL FILED

The present disclosure generally relates to image processing, particularly to methods and systems for fusing images based on a depth map.

BACKGROUND

Image fusion techniques are applied to combine information from different image sources into a single image. Resulting images contain more information than that provided by any single image source. Different sensory modalities are often applied to provide different types of information (e.g., colors, brightness, and details) in an image fusion process. For example, color images are fused with near-infrared (NIR) images, which enhance details in the color images while preserving color and brightness information of the color images. Particularly, NIR light can travel through fog, smog, or haze better than visible light, allowing some dehazing algorithms to be established based on a combination of NIR and color images. However, some materials (e.g., some bottles and human clothes) that are opaque under visible light may appear transparent under the NIR light, thereby causing some privacy concerns and holding fusion of color and NIR images from being widely adopted in consumer electronic devices. Little work has been done to address this see-through issue in earlier image fusion work, and it would be beneficial to have a mechanism to suppress a see-through effect and address the privacy concerns in image fusion.

SUMMARY

The present disclosure describes embodiments related to combining information of a truecolor image (also called an RGB image) and a corresponding NIR image based on a depth map. A severity of a see-through effect depends on materials of objects exposed to NIR light, and the materials are difficult to recognize using computer vision. It is observed that the see-through effect is more prominent in close-up image shots of an object and becomes less significant as the object moves further away in a field of view. Based on such an observation, depth information is applied to assign fusion weights (e.g., reduce fusion weights for closeup objects), thereby suppressing the see-through effect effectively.

In one aspect, an image fusion method is implemented at a computer system (e.g., a server, an electronic device having a camera, or both of them) having one or more processors, memory. The method includes obtaining an NIR image and an RGB image of a scene, generating from the NIR image a first NIR image layer having a first resolution, generating from the RGB image a first RGB image layer and a second RGB image layer, and generating a depth map. Both the first RGB image layer and the depth image have the first resolution. The method further includes generating a first combined image layer by combining each pixel of the first NIR image layer and a corresponding pixel of the first RGB image layer based on a respective weight that is determined based on a depth value of a respective pixel of the depth map and a predefined cutoff depth. The method further includes reconstructing a fused image based on the first combined image layer.

In some embodiments, the second RGB image layer has a second resolution greater than the first resolution, and the depth map includes a first depth map. The method further includes generating from the NIR image a second NIR image layer having the second resolution, generating a second depth map having the second resolution, and generating a second combined image layer. Generating the second combined image layer further includes combining each pixel of the second NIR image layer and a corresponding pixel of the second RGB image layer based on a respective weight that is determined based on a depth value of a respective pixel of the second depth map and the predefined cutoff depth. The fused image is reconstructed from the first combined image layer and the second combined image layer.

According to another aspect of the present disclosure, a computer system includes one or more processing units, memory, and a plurality of programs stored in the memory. The programs, when executed by the one or more processing units, cause the one or more processing units to perform the method for fusing NIR and color images as described above.

According to another aspect of the present disclosure, a non-transitory computer readable storage medium stores a plurality of programs for execution by a computer system having one or more processing units. The programs, when executed by the one or more processing units, cause the one or more processing units to perform the method for fusing NIR and color images as described above.

BRIEF DESCRIPTION OF DRAWINGS

The accompanying drawings, which are included to provide a further understanding of the embodiments and are incorporated herein and constitute a part of the specification, illustrate the described embodiments and together with the description serve to explain the underlying principles.

FIG. 5 is an example pyramid framework for fusing an NIR image and an RGB image, in accordance with some embodiments.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

The present disclosure describes embodiments related to combining information of an RGB image and a corresponding NIR image based on a depth map. It is observed that the see-through effect is more prominent in close-up image shots of an object and becomes less significant as the object moves further away in a field of view. Based on such an observation, some implementations of this disclosure rely on a pyramid approach that separates different resolution levels of each related RGB or NIR image and combines the corresponding resolution levels of related RGB and NIR images selectively, thereby suppressing the see-through effect in one or more selected resolution levels. Specifically, depth information is applied to assign fusion weights (e.g., reduce fusion weights for closeup objects) to eliminate the see-through effect effectively. Such depth information can be estimated using different methods (e.g., Stereo, deep learning) and represented in different forms (e.g., absolute depth, disparity). In some situations, a focus point distance, an absolute depth, or normalized depth information is provided as an input according to predefined fusion rules. Such fusion rules are based on a depth map and can effectively block NIR information related to objects in a close range while keeping a desired fusion weight for NIR information for background regions.

Figure 1:
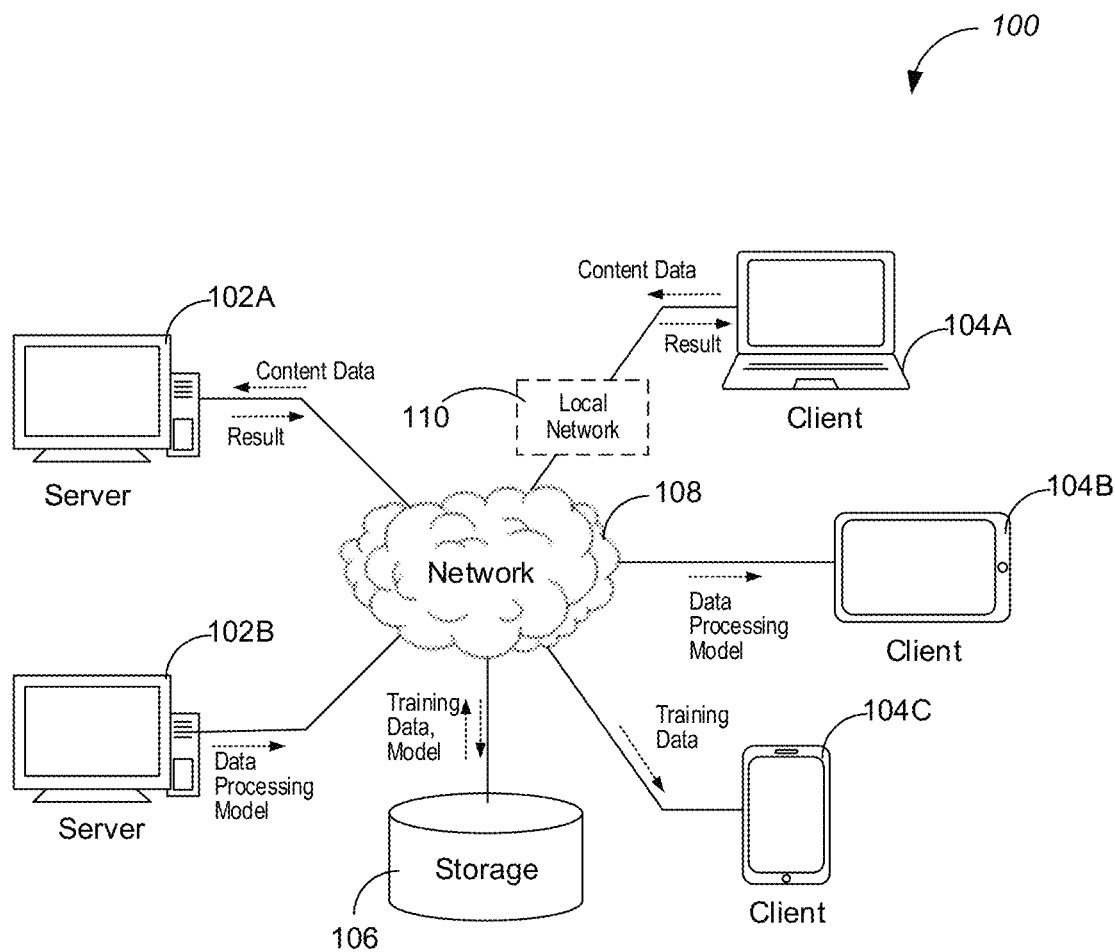
FIG. 1 is an example data processing environment having one or more servers communicatively coupled to one or more client devices, in accordance with some embodiments.

FIG. 1 is an example data processing environment 100 having one or more servers 102 communicatively coupled to one or more client devices 104, in accordance with some embodiments. The one or more client devices 104 may be, for example, desktop computers 104A, tablet computers 104B, mobile phones 104C, or intelligent, multi-sensing, network-connected home devices (e.g., a surveillance camera 104D). Each client device 104 can collect data or user inputs, executes user applications, or present outputs on its user interface. The collected data or user inputs can be processed locally at the client device 104 and/or remotely by the server(s) 102. The one or more servers 102 provide system data (e.g., boot files, operating system images, and user applications) to the client devices 104, and in some embodiments, processes the data and user inputs received from the client device(s) 104 when the user applications are executed on the client devices 104. In some embodiments, the data processing environment 100 further includes a storage 106 for storing data related to the servers 102, client devices 104, and applications executed on the client devices 104.

The one or more servers 102 can enable real-time data communication with the client devices 104 that are remote from each other or from the one or more servers 102. In some embodiments, the one or more servers 102 can implement data processing tasks that cannot be or are preferably not completed locally by the client devices 104. For example, the client devices 104 include a game console that executes an interactive online gaming application. The game console receives a user instruction and sends it to a game server 102 with user data. The game server 102 generates a stream of video data based on the user instruction and user data and providing the stream of video data for concurrent display on the game console and other client devices that are engaged in the same game session with the game console. In another example, the client devices 104 include a mobile phone 104C and a networked surveillance camera 104D. The camera 104D collects video data and streams the video data to a surveillance camera server 102 in real time. While the video data is optionally pre-processed on the camera 104D, the surveillance camera server 102 processes the video data to identify motion or audio events in the video data and share information of these events with the mobile phone 104C, thereby allowing a user of the mobile phone 104C to monitor the events occurring near the networked surveillance camera 104D in real time and remotely.

The one or more servers 102, one or more client devices 104, and storage 106 are communicatively coupled to each other via one or more communication networks 108, which are the medium used to provide communications links between these devices and computers connected together within the data processing environment 100. The one or more communication networks 108 may include connections, such as wire, wireless communication links, or fiber optic cables. Examples of the one or more communication networks 108 include local area networks (LAN), wide area networks (WAN) such as the Internet, or a combination thereof. The one or more communication networks 108 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. A connection to the one or more communication networks 108 may be established either directly (e.g., using 3G/4G connectivity to a wireless carrier), or through a network interface 110 (e.g., a router, switch, gateway, hub, or an intelligent, dedicated whole-home control node), or through any combination thereof. As such, the one or more communication networks 108 can represent the Internet of a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages.

In some embodiments, deep learning techniques are applied in the data processing environment 100 to process content data (e.g., video, image, audio, or textual data) obtained by an application executed at a client device 104 to identify information contained in the content data, match the content data with other data, categorize the content data, or synthesize related content data. In these deep learning techniques, data processing models are created based on one or more neural networks to process the content data. These data processing models are trained with training data before they are applied to process the content data. In some embodiments, both model training and data processing are implemented locally at each individual client device 104 (e.g., the client device 104C). The client device 104C obtains the training data from the one or more servers 102 or storage 106 and applies the training data to train the data processing models. Subsequently to model training, the client device 104C obtains the content data (e.g., captures video data via an internal camera) and processes the content data using the training data processing models locally. Alternatively, in some embodiments, both model training and data processing are implemented remotely at a server 102 (e.g., the server 102A) associated with one or more client devices 104 (e.g., the client devices 104A and 104D). The server 102A obtains the training data from itself, another server 102 or the storage 106 and applies the training data to train the data processing models. The client device 104A or 104D obtains the content data and sends the content data to the server 102A (e.g., in a user application) for data processing using the trained data processing models. The same client device or a distinct client device 104A receives data processing results from the server 102A, and presents the results on a user interface (e.g., associated with the user application). The client device 104A or 104D itself implements no or little data processing on the content data prior to sending them to the server 102A. Additionally, in some embodiments, data processing is implemented locally at a client device 104 (e.g., the client device 104B), while model training is implemented remotely at a server 102 (e.g., the server 102B) associated with the client device 104B. The server 102B obtains the training data from itself, another server 102 or the storage 106 and applies the training data to train the data processing models. The trained data processing models are optionally stored in the server 102B or storage 106. The client device 104B imports the trained data processing models from the server 102B or storage 106, processes the content data using the data processing models, and generates data processing results to be presented on a user interface locally.

In various embodiments of this disclosure, distinct images are captured by a camera (e.g., a standalone surveillance camera 104D or an integrated camera of a client device 104A), and processed in the same camera, the client device 104A containing the camera, a server 102, or a distinct client device 104. Optionally, deep learning techniques are trained or applied for the purposes of processing the images. In an example, a near infrared (NIR) image and an RGB image are captured by the camera. After obtaining the NIR and RGB image, the same camera, client device 104A containing the camera, server 102, or distinct client device 104 extracts a first NIR image layer and a first RGB image layer from the NIR image and the RGB image, respectively, and generates a depth map. The first NIR and RGB image layers and depth image share the same resolution. Each pixel of the first NIR image layer and a corresponding pixel of the first RGB image layer are combined based on a respective weight that is determined based on a depth value of a respective pixel of the depth map and a predefined cutoff depth. Such a combined image layer selectively suppresses details offered by the NIR image, thereby avoiding a see-through effect commonly seen in many detailed images. The combined image layer is used to reconstruct a color image that can be reviewed on the client device 104A containing the camera or the distinct client device 104.

Figure 2:
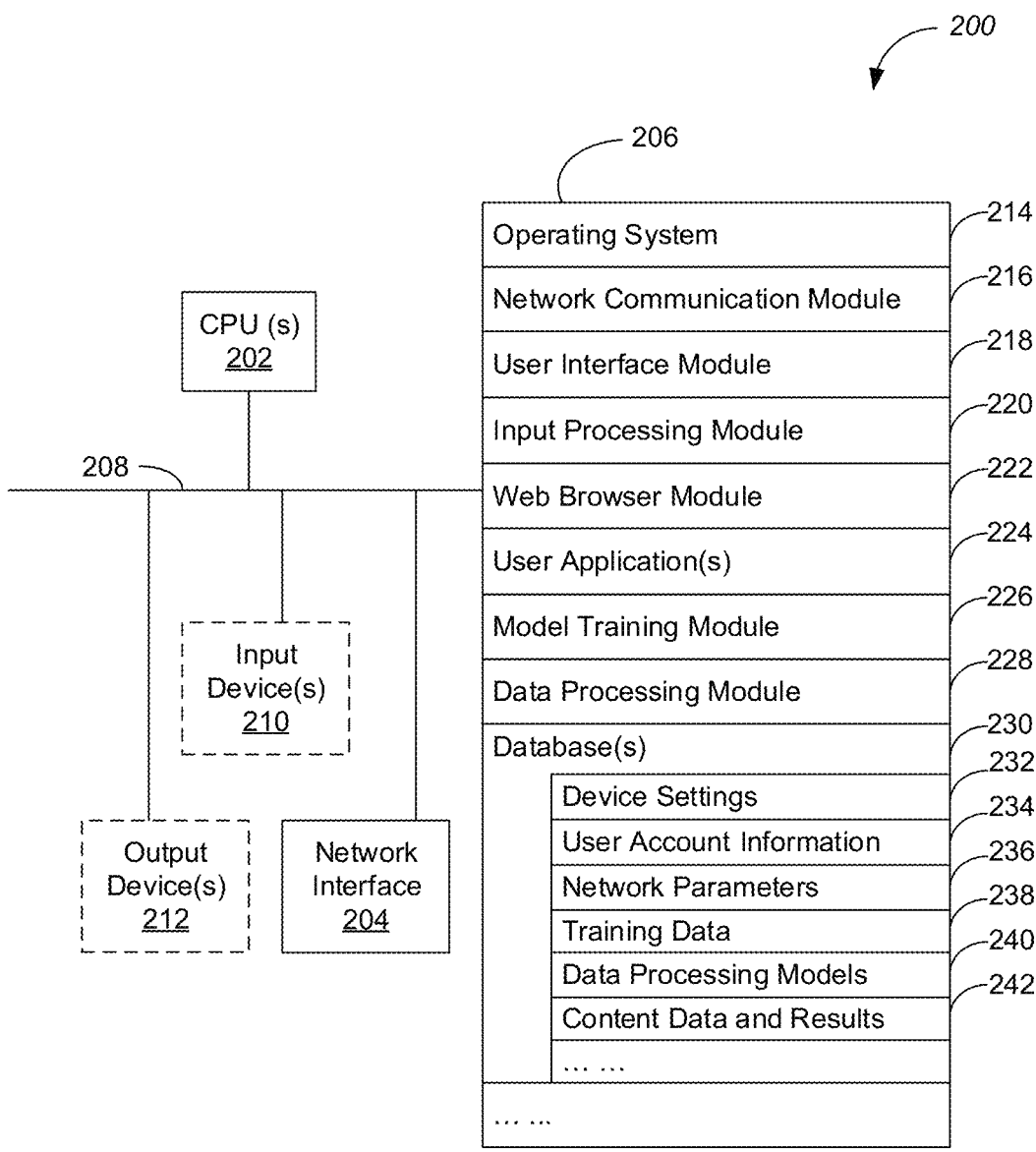
FIG. 2 is a block diagram illustrating a data processing system, in accordance with some embodiments.

FIG. 2 is a block diagram illustrating a data processing system 200, in accordance with some embodiments. The data processing system 200 includes a server 102, a client device 104, a storage 106, or a combination thereof. The data processing system 200, typically, includes one or more processing units (CPUs) 202, one or more network interfaces 204, memory 206, and one or more communication buses 208 for interconnecting these components (sometimes called a chipset). The data processing system 200 includes one or more input devices 210 that facilitate user input, such as a keyboard, a mouse, a voice-command input unit or microphone, a touch screen display, a touch-sensitive input pad, a gesture capturing camera, or other input buttons or controls. Furthermore, in some embodiments, the client device 104 of the data processing system 200 uses a microphone and voice recognition or a camera and gesture recognition to supplement or replace the keyboard. In some embodiments, the client device 104 includes one or more cameras, scanners, or photo sensor units for capturing images, for example, of graphic serial codes printed on the electronic devices. The data processing system 200 also includes one or more output devices 212 that enable presentation of user interfaces and display content, including one or more speakers and/or one or more visual displays. Optionally, the client device 104 includes a location detection device, such as a GPS (global positioning satellite) or other geo-location receiver, for determining the location of the client device 104.

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some embodiments, memory 206, or the non-transitory computer readable storage medium of memory 206, stores the following programs, modules, and data structures, or a subset or superset thereof:

Operating system 214 including procedures for handling various basic system services and for performing hardware dependent tasks;

Network communication module 216 for connecting each server 102 or client device 104 to other devices (e.g., server 102, client device 104, or storage 106) via one or more network interfaces 204 (wired or wireless) and one or more communication networks 108, such as the Internet, other wide area networks, local area networks, metropolitan area networks, and so on;

User interface module 218 for enabling presentation of information (e.g., a graphical user interface for application(s) 224, widgets, websites and web pages thereof, and/or games, audio and/or video content, text, etc.) at each client device 104 via one or more output devices 212 (e.g., displays, speakers, etc.);

Input processing module 220 for detecting one or more user inputs or interactions from one of the one or more input devices 210 and interpreting the detected input or interaction;

Web browser module 222 for navigating, requesting (e.g., via HTTP), and displaying websites and web pages thereof, including a web interface for logging into a user account associated with a client device 104 or another electronic device, controlling the client or electronic device if associated with the user account, and editing and reviewing settings and data that are associated with the user account;

One or more user applications 224 for execution by the data processing system 200 (e.g., games, social network applications, smart home applications, and/or other web or non-web based applications for controlling another electronic device and reviewing data captured by such devices);

Model training module 226 for receiving training data and establishing a data processing model for processing content data (e.g., video, image, audio, or textual data) to be collected or obtained by a client device 104;

Data processing module 228 for processing content data using data processing models 240, thereby identifying information contained in the content data, matching the content data with other data, categorizing the content data, or synthesizing related content data, where in some embodiments, the data processing module 228 is associated with one of the user applications 224 to process the content data in response to a user instruction received from the user application 224;

Depth-based image processing module 250 for decomposing each of different types of images (e.g., an NIR image and an RGB image) to one or more respective image layers, combining two associated image layers decomposed from two different types of images based on a depth map, and reconstructing an image based on a combined image layer, where in some embodiments, one or more image processing operations involve deep learning and are implemented jointly with the data processing module 228; and One or more databases 230 for storing at least data including one or more of:
  Device settings 232 including common device settings (e.g., service tier, device model, storage capacity, processing capabilities, communication capabilities, etc.) of the one or more servers 102 or client devices 104;
  User account information 234 for the one or more user applications 224, e.g., user names, security questions, account history data, user preferences, and predefined account settings;
  Network parameters 236 for the one or more communication networks 108, e.g., IP address, subnet mask, default gateway, DNS server and hostname;
  Training data 238 for training one or more data processing models 240;
  Data processing model(s) 240 for processing content data (e.g., video, image, audio, or textual data) using deep learning techniques; and
  Content data and results 242 that are obtained by and outputted to the client device 104 of the data processing system 200, respectively, where the content data is processed locally at a client device 104 or remotely at a server 102 or a distinct client device 104 to provide the associated results 242 to be presented on the same or distinct client device 104, and examples of the content data and results 242 include RGB images, NIR images, depth maps, and images reconstructed therefrom.

Optionally, the one or more databases 230 are stored in one of the server 102, client device 104, and storage 106 of the data processing system 200. Optionally, the one or more databases 230 are distributed in more than one of the server 102, client device 104, and storage 106 of the data processing system 200. In some embodiments, more than one copy of the above data is stored at distinct devices, e.g., two copies of the data processing models 240 are stored at the server 102 and storage 106, respectively.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 206, optionally, stores a subset of the modules and data structures identified above. Furthermore, memory 206, optionally, stores additional modules and data structures not described above.

Figure 3:
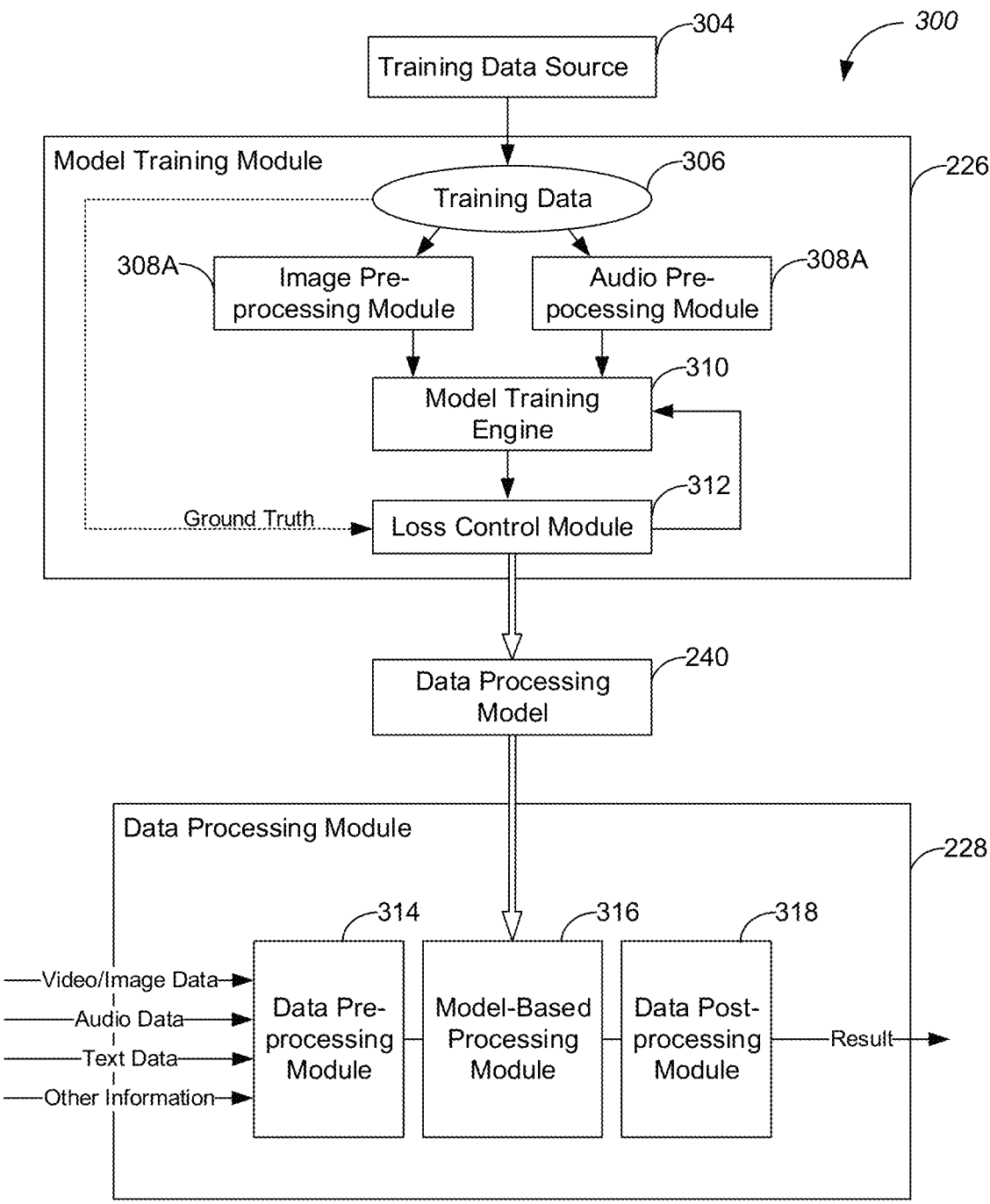
FIG. 3 is an example data processing environment for training and applying a neural network based (NN-based) data processing model for processing visual and/or audio data, in accordance with some embodiments.

FIG. 3 is another example data processing system 300 for training and applying a neural network based (NN-based) data processing model 240 for processing content data (e.g., video, image, audio, or textual data), in accordance with some embodiments. The data processing system 300 includes a model training module 226 for establishing the data processing model 240 and a data processing module 228 for processing the content data using the data processing model 240. In some embodiments, both of the model training module 226 and the data processing module 228 are located on a client device 104 of the data processing system 300, while a training data source 304 distinct from the client device 104 provides training data 306 to the client device 104. The training data source 304 is optionally a server 102 or storage 106. Alternatively, in some embodiments, both of the model training module 226 and the data processing module 228 are located on a server 102 of the data processing system 300. The training data source 304 providing the training data 306 is optionally the server 102 itself, another server 102, or the storage 106. Additionally, in some embodiments, the model training module 226 and the data processing module 228 are separately located on a server 102 and client device 104, and the server 102 provides the trained data processing model 240 to the client device 104.

The model training module 226 includes one or more data pre-processing modules 308, a model training engine 310, and a loss control module 312. The data processing model 240 is trained according to a type of the content data to be processed. The training data 306 is consistent with the type of the content data, so a data pre-processing module 308 applied to process the training data 306 is consistent with the type of the content data. For example, an image pre-processing module 308A is configured to process image training data 306 to a predefined image format, e.g., extract a region of interest (ROI) in each training image, and crop each training image to a predefined image size. Alternatively, an audio pre-processing module 308B is configured to process audio training data 306 to a predefined audio format, e.g., converting each training sequence to a frequency domain using a Fourier transform. The model training engine 310 receives pre-processed training data provided by the data pre-processing modules 308, further processes the pre-processed training data using an existing data processing model 240, and generates an output from each training data item. During this course, the loss control module 312 can monitor a loss function comparing the output associated with the respective training data item and a ground truth of the respective training data item. The model training engine 310 modifies the data processing model 240 to reduce the loss function, until the loss function satisfies a loss criteria (e.g., a comparison result of the loss function is minimized or reduced below a loss threshold). The modified data processing model 240 is provided to the data processing module 228 to process the content data.

In some embodiments, the model training module 226 offers supervised learning in which the training data is entirely labelled and includes a desired output for each training data item (also called the ground truth in some situations). Conversely, in some embodiments, the model training module 226 offers unsupervised learning in which the training data are not labelled. The model training module 226 is configured to identify previously undetected patterns in the training data without pre-existing labels and with no or little human supervision. Additionally, in some embodiments, the model training module 226 offers partially supervised learning in which the training data are partially labelled.

The data processing module 228 includes a data pre-processing modules 314, a model-based processing module 316, and a data post-processing module 318. The data pre-processing modules 314 pre-processes the content data based on the type of the content data. Functions of the data pre-processing modules 314 are consistent with those of the pre-processing modules 308 and covert the content data to a predefined content format that is acceptable by inputs of the model-based processing module 316. Examples of the content data include one or more of: video, image, audio, textual, and other types of data. For example, each image is pre-processed to extract an ROI or cropped to a predefined image size, and an audio clip is pre-processed to convert to a frequency domain using a Fourier transform. In some situations, the content data includes two or more types, e.g., video data and textual data. The model-based processing module 316 applies the trained data processing model 240 provided by the model training module 226 to process the pre-processed content data. The model-based processing module 316 can also monitor an error indicator to determine whether the content data has been properly processed in the data processing model 240. In some embodiments, the processed content data is further processed by the data post-processing module 318 to present the processed content data in a preferred format or to provide other related information that can be derived from the processed content data.

Figure 4A:
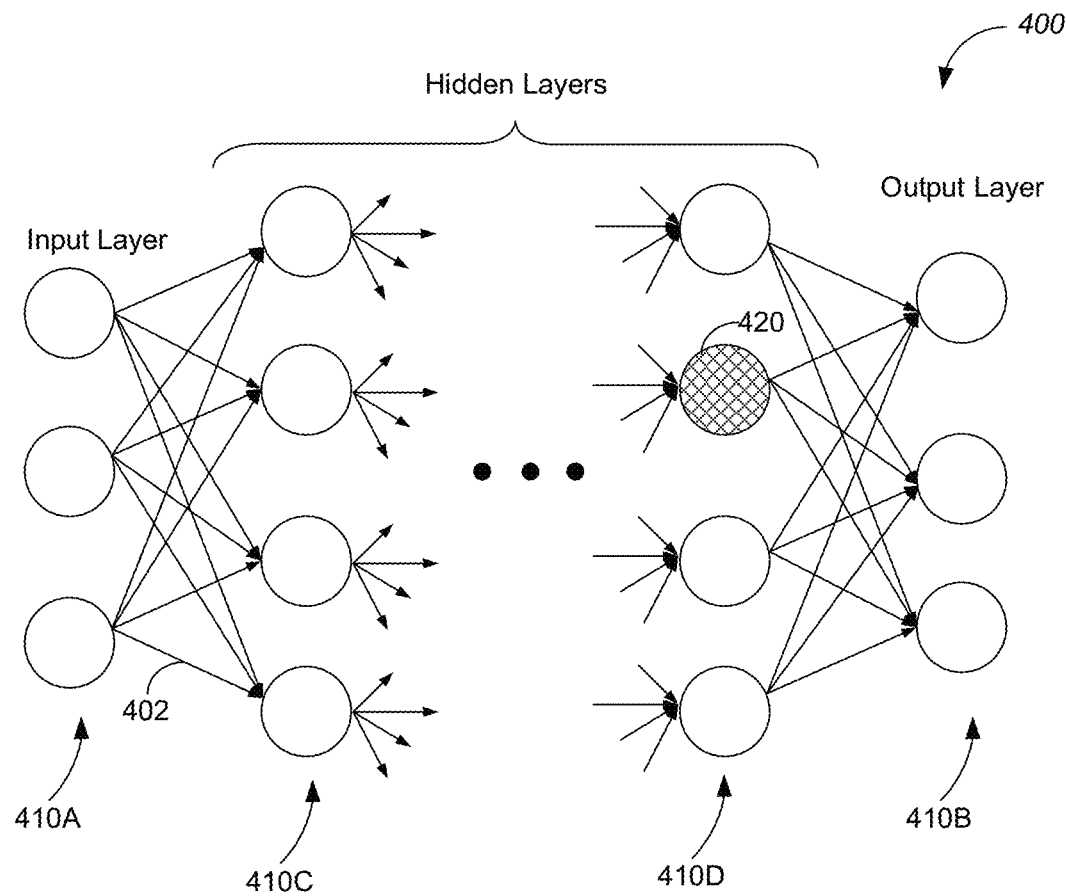
FIG. 4A is an example neural network applied to process content data in an NN-based data processing model, in accordance with some embodiments.
Figure 4B:
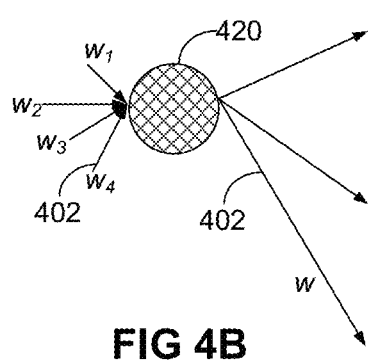
FIG. 4B is an example node in the neural network, in accordance with some embodiments.

FIG. 4A is an example neural network (NN) 400 applied to process content data in an NN-based data processing model 240, in accordance with some embodiments, and FIG. 4B is an example node 420 in the neural network (NN) 400, in accordance with some embodiments. The data processing model 240 is established based on the neural network 400. A corresponding model-based processing module 316 applies the data processing model 240 including the neural network 400 to process content data that has been converted to a predefined content format. The neural network 400 includes a collection of nodes 420 that are connected by links 412. Each node 420 receives one or more node inputs and applies a propagation function to generate anode output from the one or more node inputs. As the node output is provided via one or more links 412 to one or more other nodes 420, a weight w associated with each link 412 is applied to the node output. Likewise, the one or more node inputs are combined based on corresponding weights $w_1$, $w_2$, $w_3$, and $w_4$ according to the propagation function. In an example, the propagation function is a product of a non-linear activation function and a linear weighted combination of the one or more node inputs.

The collection of nodes 420 is organized into one or more layers in the neural network 400. Optionally, the one or more layers include a single layer acting as both an input layer and an output layer. Optionally, the one or more layers include an input layer 402 for receiving inputs, an output layer 406 for providing outputs, and zero or more hidden layers 404 (e.g., 404A and 404B) between the input and output layers 402 and 406. A deep neural network has more than one hidden layers 404 between the input and output layers 402 and 406. In the neural network 400, each layer is only connected with its immediately preceding and/or immediately following layer. In some embodiments, a layer 402 or 404B is a fully connected layer because each node 420 in the layer 402 or 404B is connected to every node 420 in its immediately following layer. In some embodiments, one of the one or more hidden layers 404 includes two or more nodes that are connected to the same node in its immediately following layer for down sampling or pooling the nodes 420 between these two layers. Particularly, max pooling uses a maximum value of the two or more nodes in the layer 404B for generating the node of the immediately following layer 406 connected to the two or more nodes.

In some embodiments, a convolutional neural network (CNN) is applied in a data processing model 240 to process content data (particularly, video and image data). The CNN employs convolution operations and belongs to a class of deep neural networks 400, i.e., a feedforward neural network that only moves data forward from the input layer 402 through the hidden layers to the output layer 406. The one or more hidden layers of the CNN are convolutional layers convolving with a multiplication or dot product. Each node in a convolutional layer receives inputs from a receptive area associated with a previous layer (e.g., five nodes), and the receptive area is smaller than the entire previous layer and may vary based on a location of the convolution layer in the convolutional neural network. Video or image data is pre-processed to a predefined video/image format corresponding to the inputs of the CNN. The pre-processed video or image data is abstracted by each layer of the CNN to a respective feature map. By these means, video and image data can be processed by the CNN for video and image recognition, classification, analysis, imprinting, or synthesis.

Alternatively and additionally, in some embodiments, a recurrent neural network (RNN) is applied in the data processing model 240 to process content data (particularly, textual and audio data). Nodes in successive layers of the RNN follow a temporal sequence, such that the RNN exhibits a temporal dynamic behavior. In an example, each node 420 of the RNN has a time-varying real-valued activation. Examples of the RNN include, but are not limited to, a long short-term memory (LSTM) network, a fully recurrent network, an Elman network, a Jordan network, a Hopfield network, a bidirectional associative memory (BAM) network, an echo state network, an independently RNN (IndRNN), a recursive neural network, and a neural history compressor. In some embodiments, the RNN can be used for handwriting or speech recognition. It is noted that in some embodiments, two or more types of content data are processed by the data processing module 228, and two or more types of neural networks (e.g., both CNN and RNN) are applied to process the content data jointly.

The training process is a process for calibrating all of the weights $w_i$ for each layer of the learning model using a training data set which is provided in the input layer 402. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured, and the weights are adjusted accordingly to decrease the error. The activation function is optionally linear, rectified linear unit, sigmoid, hyperbolic tangent, or of other types. In some embodiments, a network bias term b is added to the sum of the weighted outputs from the previous layer before the activation function is applied. The network bias b provides a perturbation that helps the NN 400 avoid over fitting the training data. The result of the training includes the network bias parameter b for each layer.

FIG. 5 is an example pyramid framework 500 for fusing an NIR image 502 and an RGB image 504, in accordance with some embodiments. The pyramid framework 500 is implemented at a computer system (e.g., a server 102, a client device 104, or a combination thereof). The computer system obtains the NIR image 502 and RGB image 504 of a scene. In some embodiments, the NIR image 502 and RGB image 504 are captured by a primary sensor and a secondary sensor of a client device (e.g., a surveillance camera 104D), respectively. In some embodiments, each of the NIR and RGB images 502 and 504 is pre-processed, e.g., to reduce a distortion level of at least a portion of the RGB and NIR images, to implement an image registration process that transforms the NIR and RGB images 502 and 504 into a coordinate system associated with the scene. In an example, only one of the NIR and RGB images 502 and 504 is processed to match the other one of the NIR and RGB images 502 and 504. The computer system configured to implement the pyramid framework 500 is optionally the camera 104D itself, the client device containing a camera that captures the NIR and RGB images, the server 102, a distinct client device configured to review a fusion output of the framework 500, or any combination of them.

The RGB image 504 optionally has a resolution greater than that of the NIR image 502. The computer system generates a first NIR image layer 506 from the NIR image 502, and the first NIR image layer 506 has a first resolution. The computer system generates a first RGB image layer 508 and a second RGB image layer 510 from the RGB image 504. The first RGB image layer 508 has the same resolution as the first NIR image layer 506, and is therefore combined with the first NIR image layer 506 on a pixel-by-pixel basis to generate a first combined image layer 512. Specifically, each pixel of the first RGB image layer 508 is combined with a corresponding pixel of the first NIR image layer 506 using a weight associated with the respective pixel. Each pixel of the resulting first combined image layer 512 ($I_{COMB}$(x, y)) is represented as follows:

$$I_{COMB}(x,y) = w(x,y) \times I_{NIR}(x,y) + (1-w(x,y)) \times I_{RGB}(x,y) \quad (1)$$

where $I_{RGB}(x,y)$ and $I_{NIR}(x,y)$ are values of the respective pixel located at a position (x,y) in the first RGB image layer 508 and the first NIR image layer 506, respectively, and w(x,y) is the respective weight associated with the first NIR image layer 506. For each pixel, the respective weight w(x,y) is determined based on a depth value of the respective pixel of a depth map and a predefined cutoff depth $D_{cutoff}$. The depth map has the same resolution as the first RGB image layer 508 and the first NIR image layer 506.

In some embodiments, an adaptive fusion rule is applied to associate the respective weight w(x,y) with each of different pixel locations, when the first NIR and RGB image layers 506 and 508 are combined. The respective weight w(x,y) of a pixel location (x,y) is expressed as a weigh assigning function of an image patch centered at the pixel location (x,y):

$$w(x,y) = f(I_{RGB}(i,j), I_{NIR}(i,j), i \in [x-\text{win}, x+\text{win}], j \in [y-\text{win}, y+\text{win}] \quad (2)$$

where the image patch includes pixels physically located within a two-dimensional range ±win of the pixel location (x,y), and $f(I_{RGB}, I_{NIR})$ is a weight peak value that is not modified directly by any depth value associated with the pixel location (x,y). In some embodiments, the weight peak value $f(I_{RGB}, I_{NIR})$ is based on one or more of a transmission level, a vegetation level and an infrared deviation level of the image patch. More details on the weight peak value $f(I_{RGB}, I_{NIR})$ are explained below with reference to FIGS. 7 and 8.

In some embodiments, for the first NIR image layer 506, an image patch centered at a specific pixel location (x,y) is associated with a visual feature (e.g., a human body, an object in a pocket, content of a document page), and preferred to be hidden from any review. A two-step depth based see-through prevention method is applied to suppress the image patch corresponding to the visual feature in the first NIR image layer 506 when the first NIR image layer 506 is combined with the first RGB image layer 508. First, in some embodiments, camera focus statistics are used to filter out close-up shots that contains an object having a see-through issue. The NIR image 502 includes camera focus information that is recorded when the NIR image 502 is captured by a camera, e.g., in an auto-focus or manual scheme. For example, the camera focus information optionally includes a focal length that can be used as a reference to determine how far an object is from the camera. The NIR image 502 can be deleted or disabled from being used in any image fusion if the focal length indicates that the object is within an unsafe range that suffers from the see-through issue. Second, in some embodiments, a focal point of the NIR image 502 is beyond the unsafe range, i.e., the focal length is greater than a corresponding threshold. The depth map is used as a parameter in the weight assigning function as follows:

$$w(x,y) = f(I_{RGB}(i,j), I_{NIR}(i,j), D(i,j)), i \in [x-\text{win}, x+\text{win}], j \in [y-\text{win}, y+\text{win}] \quad (3)$$

where D(i,j) is an estimated scene depth value in a neighborhood of (x,y), i.e., the image patch centered at the pixel location (x,y).

In some embodiments, the scene depth D represents a true distance of an object from the camera. Given an absolute depth of the scene, the weight assigning function is represented as:

$$w(x, y) = f(I_{RGB}(i, j), I_{NIR}(i, j)) * \min\left(1, \log_p\left(\max\left(1, \frac{D(x, y)}{D_{cutoff}}\right)\right)\right), \quad (4)$$

$$p \in (1, \infty]$$

where $D_{cutoff}$ is a predefined cutoff depth beyond which the NIR image 502 is not capable of see through objects in the scene. In some embodiments, a value of the predefined cutoff depth $D_{cutoff}$ is individualized for each individual camera and varies with lens specifications. The predefined cutoff depth $D_{cutoff}$ can be measured.

Alternatively, in some embodiments, the image depth D of equations (2)-(4) corresponds to a disparity map of the scene, and each disparity value DP(x,y) in the disparity map is correlated with a reciprocal of an image depth D(x,y) given a baseline and camera parameters (e.g., a focal length) of the camera used to capture the RGB image 504. Each disparity value is measured in pixels, e.g., equal to 20 or 30 pixels. In some situations, when camera information is limited and the absolute depth cannot be determined, the disparity map is applied to derive the weight assigning function as:

$$w(x, y) = f(I_{RGB}(i, j), I_{NIR}(i, j)) * \left(1 - \left(\frac{\min(DP(x, y), DP_{cutoff})}{DP_{cutoff}}\right)^p\right), \quad (5)$$

$$p \in (0, 1]$$

where $DP_{cutoff}$ is a predefined cutoff disparity below which the see-through issue is negligible for the NIR image 502 and NIR and RGB fusion is allowed, and p is a control index what controls how fast the respective weight w(x,y) decreases with an increase of a disparity value DP(x,y). The predefined cutoff disparity $DP_{cutoff}$ is also called a predefined maximum disparity that corresponds to a minimum depth above which the see-through issue is negligible for the NIR image 502 and the NIR and RGB fusion is allowed. In some embodiments, $f(I_{RGB}, I_{NIR})$ in equations (4) and (5) is a weight peak value determined based on one or more of a transmission level, a vegetation level and an infrared deviation level of an image patch. More details on the weight peak value $f(I_{RGB}, I_{NIR})$ are explained below with reference to FIGS. 7 and 8.

As the depth value D(x,y) decreases from a predefined cutoff depth $D_{cutoff}$ to 0, the disparity DP(x,y) increases from the predefined cutoff disparity $DP_{cutoff}$ to the infinity, and the see-through effect is fully suppressed because the weight w(x,y) is equal to 0 (i.e., the NIR image layer 506 is not combined into the first combined image layer 512). Conversely, as the depth value D(x,y) increases from the predefined cutoff depth $D_{cutoff}$ to an infinite distance, the disparity DP(x,y) decreases from the predefined cutoff disparity $DP_{cutoff}$ to 0, and the see-through effect is controlled with an increasing weight w(x,y). More details on a correlation of the weight w(x,y) and the disparity D(x,y) are explained below with reference to FIG. 10.

After combining the first NIR and RGB image layers 506 and 508, the computer system reconstructs a fused image 514 based on the first combined image layer 512. In some embodiments, the first NIR layer 506 is identical to the NIR image 502, while the RGB image 504 is decomposed to the first and second RGB image layers 508 and 510. The first combined image layer 512 is combined with the second RGB image layer 510 to reconstruct the fused image 514.

In some embodiments, a pyramid is applied to decompose RGB image 504, when the RGB image 504 has a higher resolution than the NIR image 502. The pyramid optionally includes a lowpass pyramid configured to smooth the RGB image 504 and subsampling the smoothed image 504 (e.g., by a factor of 2 along each coordinate direction) repeatedly in one or more cycles. Each cycle results in an image layer having a smaller resolution with increased smoothing. Stated another way, the pyramid corresponds to a plurality of image layers having a decreasing image resolution from a lower image layer to a higher image layer. Specifically, in a Gaussian pyramid, image layers are weighted down using a Gaussian average (Gaussian blur) and scaled down. Each pixel containing a local average corresponds to a neighborhood pixel on a lower image layer of the pyramid. In a Laplacian pyramid, a respective difference image is stored for each image layer, except that only the highest image layer is not a difference image, thereby allowing all of the image layers in the Laplacian pyramid to be reconstructed based on the highest image layer.

Figure 6:
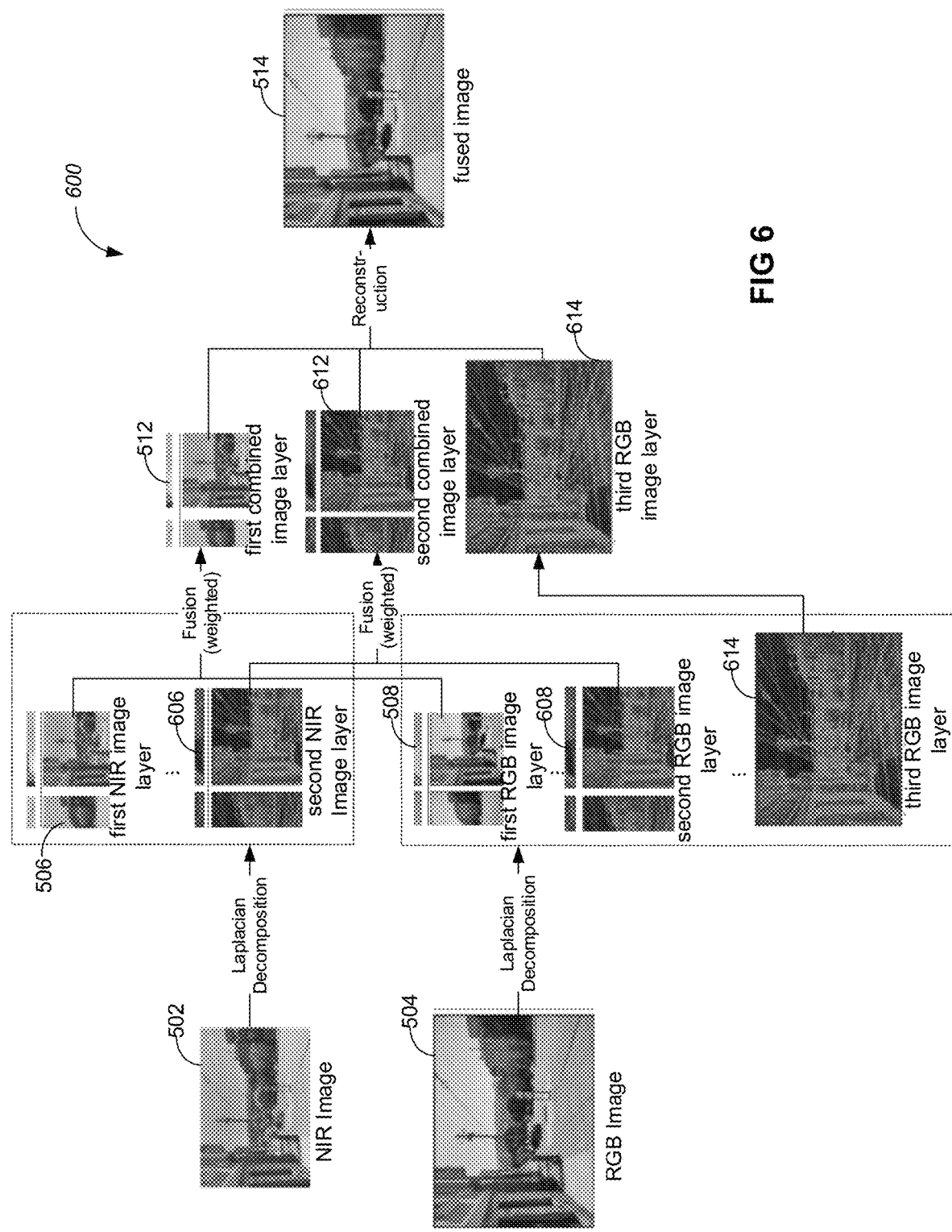
FIG. 6 is another example pyramid framework fusing an NIR image and an RGB image, in accordance with some embodiments.

FIG. 6 is another example pyramid framework 600 fusing an NIR image 502 and an RGB image 504, in accordance with some embodiments. The pyramid framework 600 is implemented at a computer system (e.g., a server 102, a client device, or a combination thereof). The computer system obtains the NIR image 502 and RGB image 504 of a scene. The computer system generates a first NIR image layer 506 having a first resolution and a second NIR image layer 606 having a second resolution greater than the first resolution. The computer system also generates a first RGB image layer 508 and a second RGB image layer 608 from the RGB image 504. The first RGB image layer 508 has the same resolution as the first NIR image layer 506, and is therefore combined with the first NIR image layer 506 on a pixel-by-pixel basis to generate a first combined image layer 512. The second RGB image layer 608 has the same resolution as the second NIR image layer 606, and is therefore combined with the second NIR image layer 606 on a pixel-by-pixel basis to generate a second combined image layer 612. A second depth map is also generated and has the second resolution of the second NIR and RGB image layers 606 and 608. Each pixel of the second NIR image layer 606 and a corresponding pixel of the second RGB image layer 608 are generated based on a respective weight that is determined based on a depth value of a respective pixel of the second depth map and a predefined cutoff depth $D_{cutoff}$. The predefined cutoff depth $D_{cutoff}$ is also applied to combine the first NIR and RGB image layers 506 and 508. The computer system configured to implement the pyramid framework 600 is optionally the camera 104D itself, the client device containing a camera that captures the NIR and RGB images, the server 102, a distinct client device configured to review a fusion output of the framework 500, or any combination of them.

In some embodiments, the NIR image 502 and the RGB image 504 have the same resolution, and are decomposed to two separate sets of image layers having the same number of layers (e.g., 2 layers). Each NIR image layer in the set of image layers corresponding to the NIR image 502 is combined with a respective RGB image layer in the set of image layers corresponding to the RGB image 504 to generate a respective combined image layer. The computer system reconstructs the fused image 514 based on all of the respective combined image layers (e.g., the first combined image layer 512 and the second combined image layer 612).

In some embodiments, the NIR image 502 and the RGB image 504 have different resolutions, e.g., the NIR image 502 has a smaller resolution than the RGB image 504. The NIR image 502 is used to generate the first and second NIR image layers 506 and 606, while the RGB image 504 is used to generate the first and second RGB image layers 508 and 608 and a third RGB image layer 614. The third RGB image layer 614 has a third resolution greater than the second resolution. The first RGB image layer 506 is combined with the first NIR image layer 508 on a pixel-by-pixel basis to generate the first combined image layer 512. The second RGB image layer 608 is combined with the second NIR image layer 606 on a pixel-by-pixel basis to generate the second combined image layer 612. The fused image 514 is reconstructed from the first combined image layer 512, the second combined image layer 612, and the third RGB image layer 614.

In some embodiments, a pyramid is applied to decompose each of the NIR and RGB images 502 and 504, independently of whether the NIR and RGB images 502 and 504 have the same resolution. Each pyramid optionally includes a lowpass pyramid configured to smooth the respective image 502 or 504 and subsampling the smoothed image (e.g., by a factor of 2 along each coordinate direction) repeatedly in one or more cycles. Each cycle results in an image layer having a smaller resolution with increased smoothing. Stated another way, for each of the NIR and RGB images 502 and 504, a respective pyramid corresponds to a plurality of image layers having a decreasing image resolution from a lower image layer to a higher image layer, and two image layers of different pyramids having the same resolutions are combined based on a respective weight (e.g., a respective depth-based weight). In some embodiments, the NIR and RGB images 502 and 504 are decomposed according to Gaussian pyramids. Alternatively, in some embodiments, the NIR and RGB images 602 and 604 are decomposed according to Laplacian pyramids.

Figure 7:
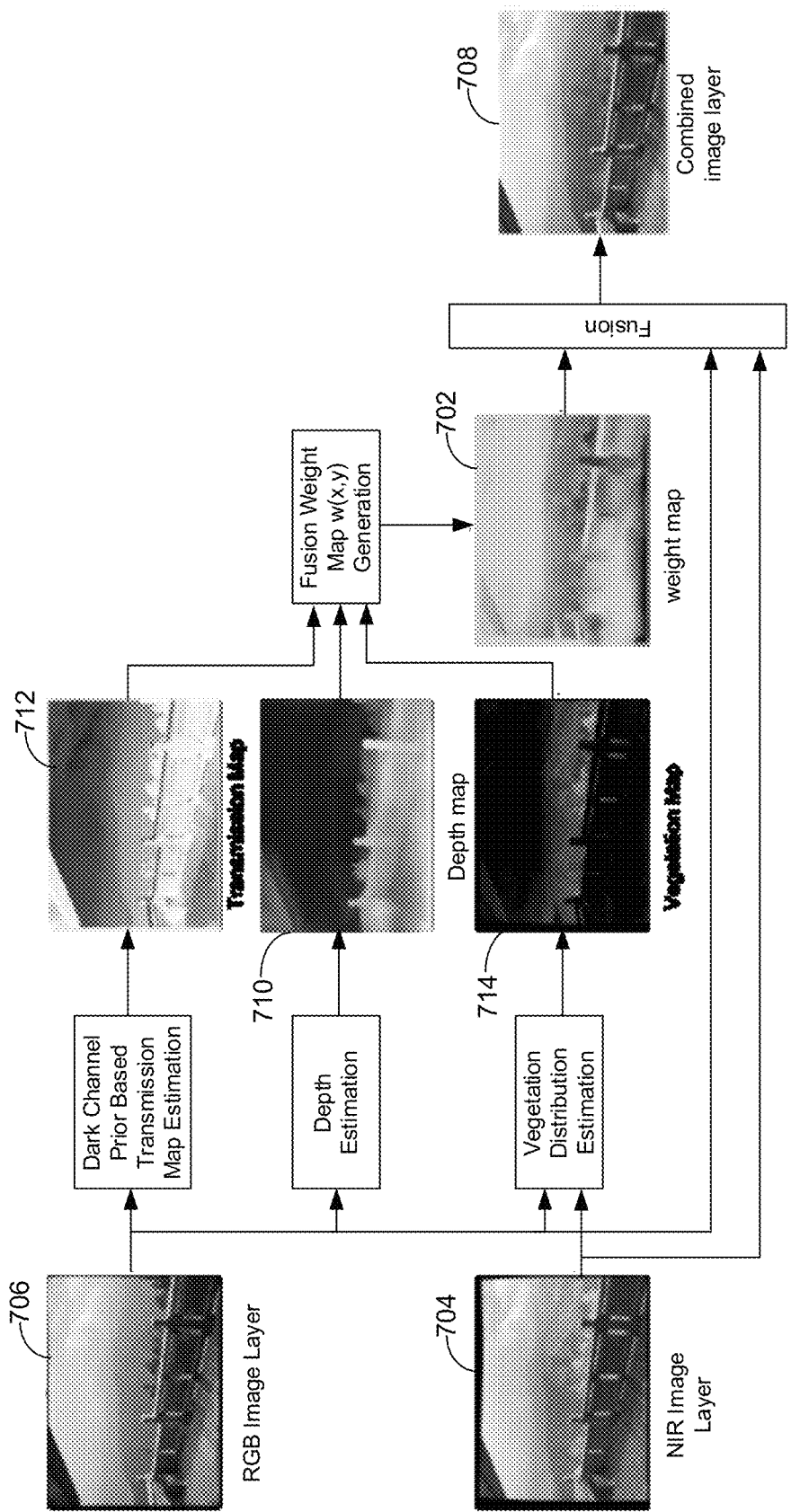
FIG. 7 illustrates an example process of generating a weight map for fusing an NIR image and an RGB image, in accordance with some embodiments.

FIG. 7 illustrates an example process 700 of generating a weight map 702 for fusing an NIR image 502 and an RGB image 504, in accordance with some embodiments. The weight map 702 includes a plurality of weights w(x,y), and each weight w(x,y) is applied to combine pixels located at a pixel position (x, y) of an NIR image layer 704 and an RGB image layer 706. As described above, the NIR image layer 704 is the NIR image 502 or one of a plurality of NIR image layers (e.g., the NIR image layers 506 and 606) decomposed from the NIR image 502, and the RGB image layer 706 is one of a plurality of RGB image layers (e.g., the RGB image layers 508, 608 and 614) decomposed from the RGB image 504. The NIR image layer 704, RGB image layer 706, and weight map 702 have the same resolution, such that the NIR image layer 704 and RGB image layer 706 can be combined to a combined image layer 708 using the weight map 702. Specifically, each pixel of the NIR image layer 704 and a corresponding pixel of the RGB image layer 706 are combined based on a respective weight w(x,y) of the weight map 702.

The weight map 702 is determined from at least a depth map 710 that contains information of a distance measured from a surface of an object that is captured in the NIR and RGB images 502 and 504 to lenses of a camera applied to capture the images 502 and 504. In some embodiments, the depth map 710 is determined based on the RGB image layer 706. In some embodiments, a depth value of each pixel of the depth map 710 represents a true distance measured from the surface of the corresponding object located at the pixel to the camera. Alternatively, in some embodiments, the depth map 710 corresponds to a disparity map of a scene, and the disparity map can be converted to an absolute image depth given a baseline and camera parameters of the camera used to capture the RGB image 504. Referring to equation (4), in some embodiments, the depth map 710 is established based on a predefined cutoff depth $D_{cutoff}$. When a depth value is less than the predefined cutoff depth $D_{cutoff}$, the respective weight w(x,y) is optionally equal to zero or less than when the depth value is greater than the predefined cutoff depth $D_{cutoff}$. For example, in an example related to equation (4), the respective weight w(x,y) is not equal to zero when the depth value is less than the predefined cutoff depth $D_{cutoff}$, and in another example related to equation (5), the respective weight w(x,y) is equal to zero as the parity DP(x,y) is greater than a predefined cutoff parity $DP_{cutoff}$ (i.e., as the depth value D(x,y) is less than the cutoff depth $D_{cutoff}$), and increases as the parity DP(x,y) drops from the cutoff parity $DP_{cutoff}$ to 0 (i.e., as the depth value D(x,y) increases from the cutoff depth $D_{cutoff}$ to an infinite distance). This prevents details that are contained in the NIR image layer 704 and related to an object located near the camera from being fused into the combined image layer 708.

Additionally, in some embodiments, the weight map 702 is determined from a combination of the depth map 710 and at least one of a transmission map 712 and a vegetation map 714. It is noted that a depth-based control portion in equations (4) and (5) is determined based on the depth map 710 and that a weight peak value $f(I_{RGB}, I_{NIR})$ in equations (4) and (5) is determined based on the transmission map 712 and/or vegetation map 714. Each of the transmission map 712 and vegetation map 714 has the same resolution as the NIR and RGB image layers 704 and 706. The transmission map 712 describes a portion of light that is not scattered and reaches a camera that captures the RGB image 504, and is optionally generated from the RGB image layer 706. The vegetation map 714 provides optical measures of vegetation canopy "greenness" and gives a direct measure of photosynthetic potential resulting from the composite property of total leaf chlorophyll, leaf area, canopy cover, and structure. The vegetation map 714 is optionally generated from both the NIR image layer 704 and RGB image layer 706. Each of the transmission map 712 and vegetation map 714 can provide additional information concerning whether details in each pixel need to be reduced from the combined image layer 708. As such, each weight w(x,y) of the weight map 702 is generated based on a combination of corresponding pixel values in the depth map 710 and one or both of the transmission map 712 and vegetation map 714.

Figure 8:
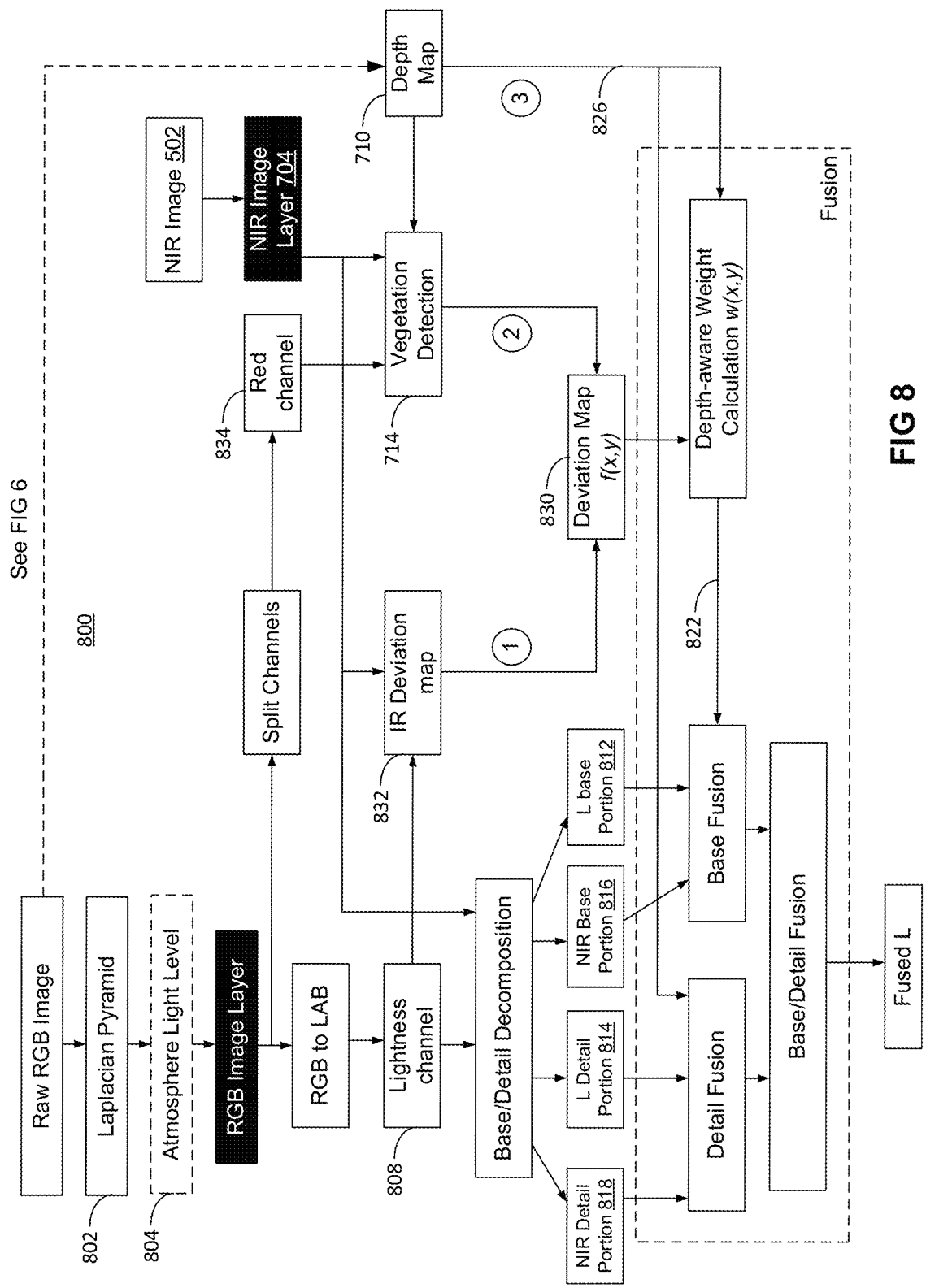
FIG. 8 is a flowchart of an overall process of fusing an NIR image and an RGB image using a depth-based weight map, in accordance with some embodiments.

FIG. 8 is a flowchart of an overall process 800 of fusing an NIR image 502 and an RGB image 504 using a depth-based weight map 702, in accordance with some embodiments. One or more NIR image layers 704 are generated from the NIR image 502. A plurality of RGB image layers 706 are generated from the RGB image 504. In an example shown in FIG. 5, the NIR image 502 is converted to a single NIR image layer 506 having a first resolution, and the plurality of RGB image layers 706 include a first RGB image layer 508 having the first resolution and a second RGB image layer having a second resolution larger than the first resolution. In another example shown in FIG. 6, the NIR image 502 is converted to the NIR image layers 704 that include at least a first NIR image layer 506 having a first resolution and a second NIR image layer 606 having a second resolution larger than the first resolution. The RGB image layers 706 include at least a first RGB image layer 508 having the first resolution and a second RGB image layer 608 having the second resolution. Further, in some embodiments, the RGB image layers 706 include a third image layer 614 having a third resolution larger than the first and second resolutions. In some embodiments, each of the RGB image layers 706 is part of a Laplacian pyramid 802 including a plurality of image layers decomposed from the RGB image 504, and may be adjusted based on an atmosphere light level 804.

In some embodiments, each RGB image layer 706 is converted (606) from an RGB color space to a CIELAB color space (i.e., L*a*b*) in which color information is expressed as a lightness channel (L*) 808 and two unique color channels, in which color information is expressed as lightness channel (L*) 808 and two unique color channels (a* and b*). The channel 808 of the first RGB layer 508 having the lowest resolution corresponds to a channel L base portion 812, while the channel 808 of each RGB image layer having a higher resolution (e.g., the layer 510, 608, or 615) corresponds to a respective channel L detail portion 814. Similarly, the first NIR image layer 506 having the lowest resolution corresponds to an NIR base portion 816, while each NIR image layer having a higher resolution (e.g., the layer 606) corresponds to a respective NIR detail portion 818. In some embodiments, the NIR image 502 and the RGB image 504 are combined by combining (620) the channel L and NIR base portions 812 and 816 separately and using a first weight setting 822, combining (628) the channel L and NIR detail portions 814 and 818 using a second weight setting 826, and fusing (628) a combined detail portion and a combined base portion. Referring to FIG. 6, the combined detail and base portions correspond to the first and second combined image layers 512 and 612, respectively. The fused portions are associated with the lightness channel 808, and can be recombined with the color information of the two unique color channels (a* and b*).

In some embodiments, the first weight setting 822 used to combine the channel L and NIR base portions 812 and 816 is determined based on a weight map 702. The weight map 702 is based on at least a depth map 710 that is optionally derived from the RGB image 504. The second weight setting 826 used to combine the channel L and NIR detail portions 814 and 818 is determined based on the depth map 710. In some situations, the weight map 702 is based on a combination of the depth map 710 and the transmission map 712. Alternatively, in some situations, the weight map 702 is based on a combination of the depth map 710 and the vegetation map 714. Additionally and alternatively, in some situations, the weight map 702 is based on a combination of the depth map 710, the transmission map 712, and the vegetation map 714. Specifically, for the weight map 702 described in equation (4) or (5), a depth-based control portion is determined based on the depth map 710, and a weight peak value $f(I_{RGB}, I_{NIR})$ is determined based on the transmission map 712 and/or vegetation map 714. More details on generating the depth map 710 are explained below with reference to FIG. 9.

In some implementations, the first weight setting 822 (i.e., the weight map 702) used to combine the channel L and NIR base portions 812 and 816 is determined based on the depth map 710 and a deviation map 830. The deviation map 830 is determined based on an IR deviation map 832 or the vegetation map 714. The vegetation map 714 is optionally determined based on the corresponding NIR image layer 704, the depth map 710, and a red channel 834 split from the RGB image layer 706. The IR deviation map 832 may be determined based on the NIR image layer 704, and the color information of the lightness channel 808. As such, the first weight setting 822 (i.e., the weight map 702) is determined based on the IR deviation map 832, vegetation map 714, and depth map 710. Stated another way, for the weight map 702 described in equation (4) or (5), the depth map 710 determines a depth-based control portion, and the depth map 710 and at least one of the IR deviation map 832 and vegetation map 714 jointly determine a weight peak value $f(I_{RGB}, I_{NIR})$ in equations (4) and (5).

Figure 9:
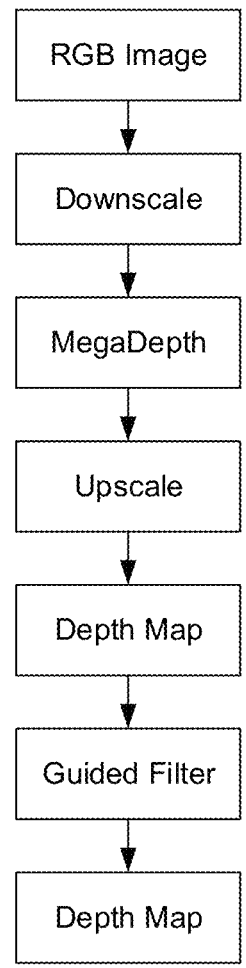
FIG. 9 is a flowchart of a process of generating a depth map based on an RGB image, in accordance with some embodiments.

FIG. 9 is a flowchart of a process 900 of generating a depth map 710 based on an RGB image 504, in accordance with some embodiments. The RGB image 504 is scaled (902) down to a depth resolution, and provided to a deep learning model 904 that is optionally trained using a large depth dataset MegaDepth. MegaDepth uses multi-view Internet photo collections, a virtually unlimited data source, to generate training data via modern structure-from-motion and multi-view stereo (MVS) methods. The MegaDepth-trained deep learning model 904 outputs a depth image 905 that has the depth resolution and is further scaled up to a preliminary depth map 908 having a target resolution. In some embodiments, a guided filter 910 is applied to process the preliminary depth map 908 to filter out noise or texture while retaining sharp edges of the preliminary depth map 908, thereby generating a filtered depth map 912. One of the preliminary and filtered depth maps 908 and 912 is applied as the depth map 710. The depth map 710 can be further used to generate a weight map 702 based on which an NIR image layer 704 and an RGB image layer 706 are combined.

Conversely, in some embodiments not shown in FIG. 9, the depth map 710 having the first resolution is generated from the RGB image 504 and the NIR image 502 using a stereo depth estimation model rather than the MegaDepth-trained deep learning model 904.

Figure 10:
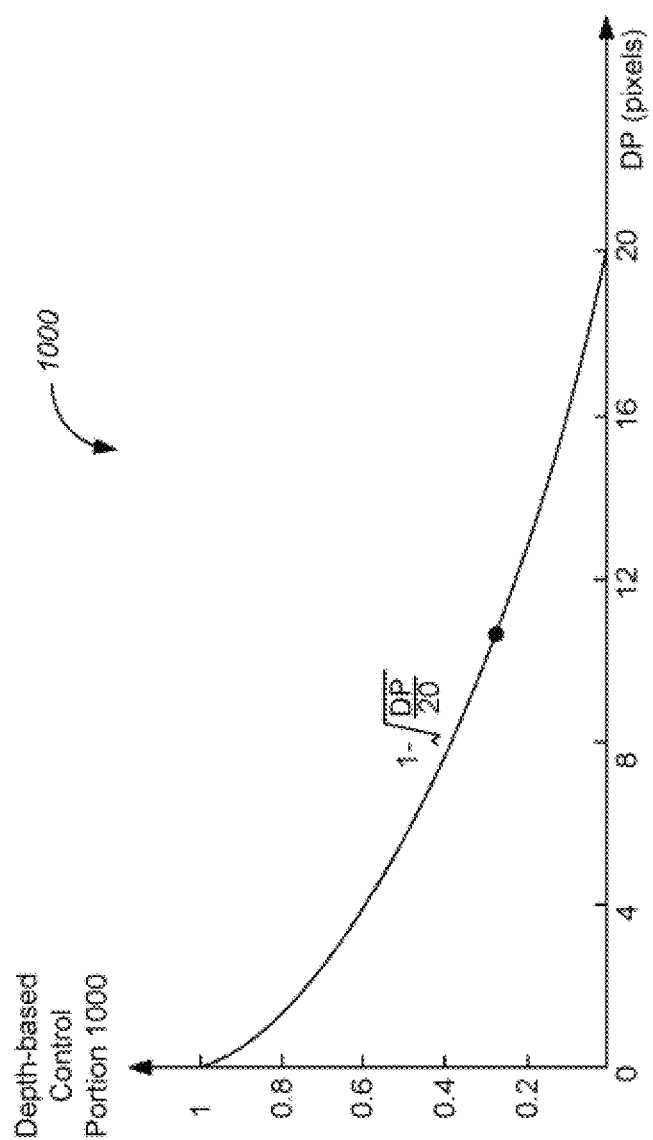
FIG. 10 is a diagram illustrating a depth-based control portion of an example weight assigning function, in accordance with some embodiments.

FIG. 10 is a diagram illustrating a depth-based control portion 1000 of an example weight assigning function, in accordance with some embodiments. The depth map 710 corresponds to a parity map. The depth-based control portion 1000 of the weight assigning function in equation (5) is determined based on the parity map as follows:

$$1 - \left(\frac{\min(DP(x, y), DP_{cutoff})}{DP_{cutoff}}\right)^p, p \in (0, 1] \tag{6}$$

wherein DP(x,y) is a disparity value of a respective pixel located at a position (x,y) in the disparity map corresponding to the depth map 710. In some embodiments, the control index p is in a range of [0.5, 0.8]. Each disparity value DP(x,y) in the disparity map is correlated with a reciprocal of the image depth D(x,y) given a baseline and camera parameters (e.g., a focal length) of the camera used to capture the RGB image 504. Each disparity value is measured in pixels, e.g., equal to 20 or 30 pixels. In an example, the control index is equal to 0.5. the predefined cutoff depth $DP_{cutoff}$ is equal to 20 pixels.

Specifically, as the depth value D(x,y) decreases from the cutoff depth $D_{cutoff}$ to 0, the disparity DP(x,y) increases from the predefined cutoff disparity $DP_{cutoff}$ to the infinity, and the see-through effect is fully suppressed because the depth-based control portion 1000 and weight w(x,y) are equal to 0 (i.e., the NIR image layer 506 is not combined into the combined image layer 514). Conversely, as the depth value D(x,y) increases from the predefined cutoff depth $D_{cutoff}$ to an infinite distance, the disparity DP(x,y) decreases from the predefined cutoff disparity $DP_{cutoff}$ to 0, and the see-through effect is controlled with an increasing depth-based control portion 1000 and weight w(x,y). As shown in FIG. 10, the depth-based control portion 1000 of the weight assigning function in equation (5) is equal to 0 when the parity value DP is greater than 20 pixels, and is represented as $$1 - \sqrt{\frac{DP(x, y)}{20}}$$

when the parity value DP is not greater than 20 pixels.

Figure 11:
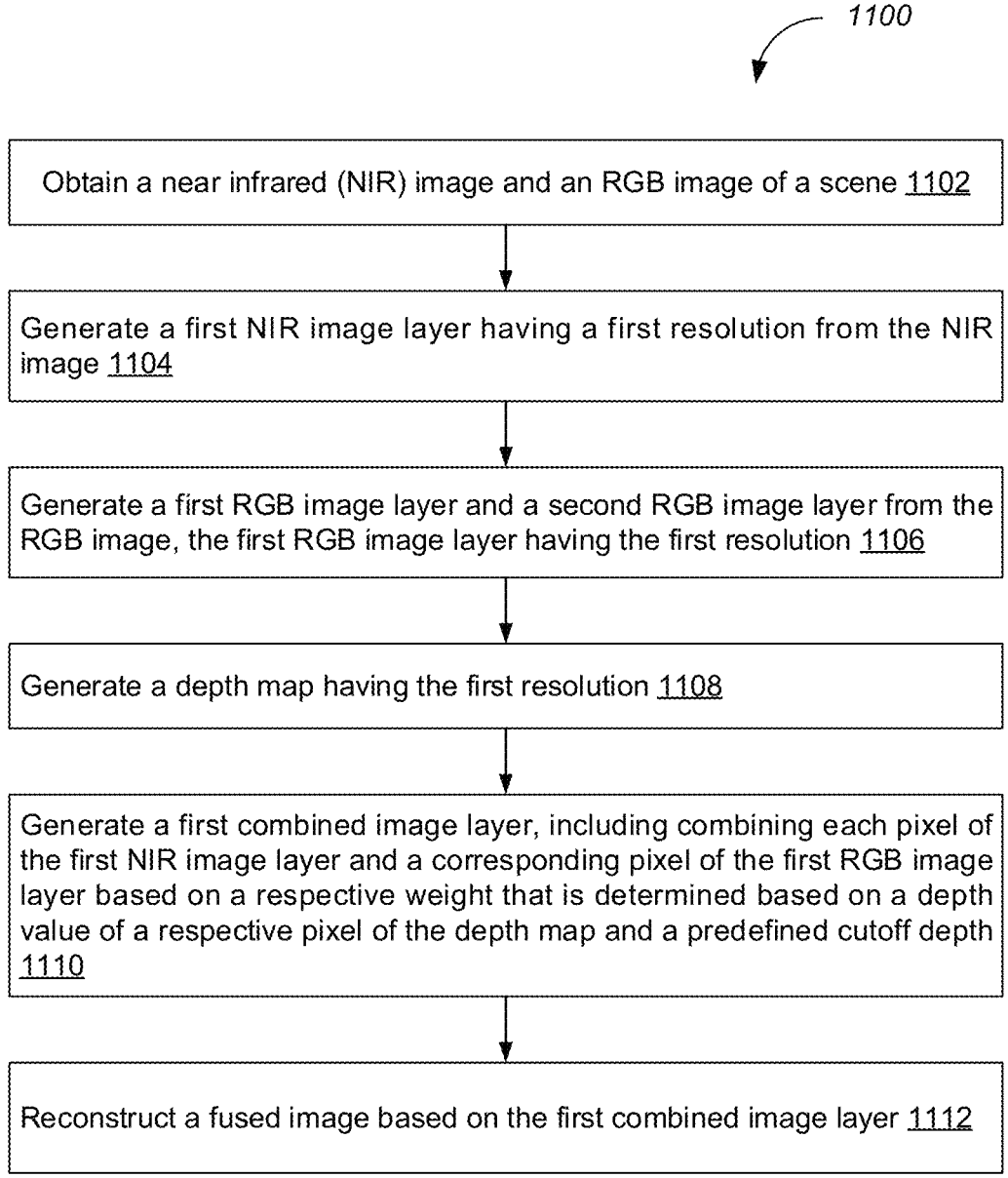
FIG. 11 is a flow diagram of an image fusion method implemented at a computer system, in accordance with some embodiments.

FIG. 11 is a flow diagram of an image fusion method 1100 implemented at a computer system, in accordance with some embodiments. The method 1100 is, optionally, governed by instructions that are stored in a non-transitory computer readable storage medium and that are executed by one or more processors of the computer system (e.g., a server 102, a client device 104, or a combination thereof). Each of the operations shown in FIG. 11 may correspond to instructions stored in the computer memory or computer readable storage medium (e.g., memory 206 in FIG. 2) of the computer system 200. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in method 1100 may be combined and/or the order of some operations may be changed. More specifically, the method 1100 is governed by instructions stored in a depth-based image processing module 250, a data processing module 228, or both in FIG. 2.

The computer system obtains (1102) an NIR image 502 and an RGB image 504 of a scene. A first NIR image layer 506 having a first resolution is generated (1104) from the NIR image 502. A first RGB image layer 508 and a second RGB image layer 510 are generated (1106) from the RGB image 504. The first RGB image layer 508 has the first resolution. A depth map 710 is generated (1108), e.g., from the RGB image 504, and has the first resolution. The computer system generates a first combined image layer by combining (1110) each pixel of the first NIR image layer 506 and a corresponding pixel of the first RGB image layer 508 based on a respective weight w(x,y) that is determined based on a depth value D(x,y) of a respective pixel of the depth map 710 and a predefined cutoff depth $D_{cutoff}$. A fused image 514 is reconstructed (1112) based on the first combined image layer 512. In some embodiments, the predefined cutoff depth $D_{cutoff}$ is between 5 and 10 meters.

In some embodiments, for each pixel of the first NIR image layer 506, in accordance with a determination that the depth value of the respective pixel of the depth map 710 is greater than or equal to the predefined cutoff depth $D_{cutoff}$, the computer system determines the respective weight w(x, y) for the respective pixel of the first NIR image layer 506 based on a two dimensional position (x, y) of the respective pixel on the first NIR image layer 506. The respective weight w(x,y) is based on a respective first weight (i.e., a weight peak value f($I_{RGB}$, $I_{NIR}$) in equations (4) and (5)) independently of a magnitude of the depth value D(x,y). Further, in some embodiments, for each pixel of the first NIR image layer 508, in accordance with a determination that the depth value D(x,y) of the respective pixel of the depth map 710 is less than the predefined cutoff depth $D_{cutoff}$, a value of the respective weight w(x,y) is scaled for the respective pixel of the first NIR image layer 506 from the respective first weight value based on the depth value D(x,y) of the respective pixel of the depth map 710. Referring to equation (4) or (5), in some embodiments, the value of the respective weight w(x,y) is scaled from the respective first weight value (i.e., a weight peak value f($I_{RGB}$, $I_{NIR}$)) nonlinearly based on the depth value D(x,y) of the respective pixel of the depth map 710.

In some embodiments, each pixel of the first NIR image layer 506 and a corresponding pixel of the first RGB image layer 508 is combined according to equation (1). Further, in some embodiments, for each pixel, the respective weight w(x,y) is represented as equation (5) including a control index p. In an example, the control index p is in a range of [0.5, 0.8].

In some embodiments, prior to combining each pixel of the first NIR image layer 506 and the corresponding pixel of the first RGB image layer 508, the computer system determines the respective weight w(x,y) at least partially based on a haze level in the RGB image 504 and/or a reflection rate in the NIR image 502. For example, referring to FIG. 6, atmosphere light is monitored (802) to determine how heavy is the haze in the RGB image 504, and infrared deviation is monitored (832) and a vegetation map is created (514) for generating the respective weight w(x,y), particularly when the reflection rate of the NIR image 502 is higher than that of the RGB image 504.

In some embodiments, the first NIR image layer 506 is identical to the NIR image 502, and the RGB image 504 is converted to the first and second RGB image layers 508 and 510 via Laplacian decomposition. The fused image 514 is reconstructed from the first combined image layer 512 and the second RGB image layer 510.

Referring to FIG. 6, in some embodiments, the second RGB image layer 608 has a second resolution greater than the first resolution, and the depth map 710 includes a first depth map. The computer system generates a second NIR image layer 606 having the second resolution from the NIR image 502, and a second depth map having the second resolution. A second combined image layer 612 is generated by combining each pixel of the second NIR image layer 406 and a corresponding pixel of the second RGB image layer 408 based on a respective weight that is determined based on a depth value of a respective pixel of the second depth map and the predefined cutoff depth $D_{cutoff}$. The fused image 514 is reconstructed from the first combined image layer 512 and the second combined image layer 612.

Also, referring to FIG. 6, in some embodiments, the depth map 710 includes a first depth map. The computer system generates a second NIR image layer 606 having a second resolution from the NIR image 502, and a second depth map having the second resolution. The second resolution is greater than the first resolution. The computer system generates a third RGB image layer 614 having a third resolution from the RGB image. A second combined image layer 612 is generated by combining each pixel of the second NIR image layer 606 and a corresponding pixel of the second RGB image layer 608 based on a respective weight that is determined based on a depth value of a respective pixel of the second depth map and the predefined cutoff depth $D_{cutoff}$. The fused image is reconstructed from the first combined image layer 512, the second combined image layer 612, and the third RGB image layer 614. Further, in some embodiments, the second NIR image layer 606 is converted from the NIR image 502 via Laplacian decomposition, and the first, second, and third RGB image layers 508, 608, and 614 are converted from the RGB image via Laplacian decomposition and form a Laplacian pyramid.

Referring to FIG. 9, in some embodiments, the depth map 710 having the first resolution is generated by generating a depth image 905 having a depth resolution from the RGB image 504 and scaling the depth image 905 having the depth resolution to the depth map 710 having the first resolution. Further, in some embodiments, a deep learning model 904 is trained using training data (e.g., MegaDepth). The deep learning model 904 is configured to generate depth information corresponding to pixels in a single RGB image 302. The RGB image 504 is scaled (902) based on an input requirement of the deep learning model 904. The depth image 905 is generated using the scaled RGB image using the deep learning model 904.

In some embodiments, the depth map 710 having the first resolution is generated from the RGB image 504 and the NIR image 502 using a stereo depth estimation model.

In some embodiments, the method 1100 is implemented by a client device 104 having a camera. The RGB image 504 and NIR image 502 are captured using a primary sensor and a secondary sensor of the camera, respectively. The RGB image 504 has a resolution equal to or greater than that of the NIR image 502.

In some embodiments, the method 1100 is implemented at a server 102. The NIR and RGB images 502 and 504 are received from a client device 104. The client device 104 is configured to capture the RGB and NIR image using a primary sensor and a secondary sensor of the electronic device 104, respectively. The RGB image 504 has a resolution greater than or equal to that of the NIR image 502.

It should be understood that the particular order in which the operations in FIG. 11 have been described are merely exemplary and are not intended to indicate that the described order is the only order in which the operations could be performed. One of ordinary skill in the art would recognize various ways to fuse images as described herein. Additionally, it should be noted that details described above with respect to FIGS. 5-10 are also applicable in an analogous manner to the method 1100 described above with respect to FIG. 11. For brevity, these details are not repeated here.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the embodiments described in the present disclosure. A computer program product may include a computer-readable medium.

The terminology used in the description of the embodiments herein is for the purpose of describing particular embodiments only and is not intended to limit the scope of claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the embodiments. The first electrode and the second electrode are both electrodes, but they are not the same electrode.

The description of the present disclosure has been presented for purposes of illustration and description, and is not intended to be exhaustive or limited to the invention in the form disclosed. Many modifications, variations, and alternative embodiments will be apparent to those of ordinary skill in the art having the benefit of the teachings presented in the foregoing descriptions and the associated drawings. The embodiment was chosen and described in order to best explain the principles of the invention, the practical disclosure, and to enable others skilled in the art to understand the invention for various embodiments and to best utilize the underlying principles and various embodiments with various modifications as are suited to the particular use contemplated. Therefore, it is to be understood that the scope of claims is not to be limited to the specific examples of the embodiments disclosed and that modifications and other embodiments are intended to be included within the scope of the appended claims.

What is claimed is:

1. A method for image fusion, comprising:
   obtaining a near infrared (NIR) image and an RGB image of a scene;
   generating a first NIR image layer having a first resolution from the NIR image;
   generating a first RGB image layer and a second RGB image layer from the RGB image, the first RGB image layer having the first resolution;
   generating a depth map having the first resolution;
   generating a first combined image layer, including combining each pixel of the first NIR image layer and a corresponding pixel of the first RGB image layer based on a respective weight that is determined based on a depth value of a respective pixel of the depth map and a predefined cutoff depth; and
   reconstructing a fused image based on the first combined image layer.

2. The method of claim 1, further comprising for each pixel of the first NIR image layer:
   in accordance with a determination that the depth value of the respective pixel of the depth map is greater than or equal to the predefined cutoff depth, determining the respective weight for the respective pixel of the first NIR image layer based on a two dimensional position (x, y) of the respective pixel on the first NIR image layer, wherein the respective weight is based on a respective first weight independently of a magnitude of the depth value.

3. The method of claim 2, further comprising for each pixel of the first NIR image layer:
   in accordance with a determination that the depth value of the respective pixel of the depth map is less than the predefined cutoff depth, scaling a value of the respective weight for the respective pixel of the first NIR image layer from the respective first weight value based on the depth value of the respective pixel of the depth map.

4. The method of claim 3, wherein the value of the respective weight is scaled from the respective first weight value nonlinearly based on the depth value of the respective pixel of the depth map.

5. The method of claim 1, wherein each pixel of the first NIR image layer and a corresponding pixel of the first RGB image layer is combined as follows:

$$I_{COMB}(x,y)=w(x,y){\times}I_{NIR}(x,y)+(1-w(x,y)){\times}I_{RGB}(x,y)$$

where IRGB(x,y) and INIR(x,y) are values of the respective pixel located at a position (x,y) in the first RGB image layer and the first NIR image layer, respectively, and w(x,y) is the respective weight.

6. The method of claim 5, wherein for each pixel, the respective weight is represented as:

$$w(x, y) = f(I_{RGB}(x, y), I_{NIR}(x, y)) * \min\left(1, \log_p\left(\max\left(1, \frac{D(x, y)}{D_{cutoff}}\right)\right)\right),$$

$$p \in (1, \infty]$$

where D(x,y) is the depth value of the respective pixel located at the position (x,y) in the depth map, Dcufoff is the predefined cutoff depth, $f(I_{RGB}(x, y), I_{NIR}(x, y))$ is a weight peak value, and p is a control index.

7. The method of claim 5, wherein for each pixel, the respective weight is represented as:

$$w(x, y) = f(I_{RGB}(x, y), I_{NIR}(x, y)) \times \left(1 - \left(\frac{\min(D(x, y), D_{cutoff})}{D_{cutoff}}\right)^p\right),$$

$$p \in (0, 1]$$

where DP(x,y) is a disparity value of the respective pixel located at the position (x,y) in a disparity map, Dcufoff is a predefined cutoff disparity, $f(I_{RGB}(x, y), I_{NIR}(x, y))$ is a weight peak value, and p is a control index, and wherein the disparity value is associated with the depth value, and the predefined cutoff disparity is associated with the predefined cutoff depth.

8. The method of claim 1 further comprising, prior to combining each pixel of the first NIR image layer and the corresponding pixel of the first RGB image layer:
determining the respective weight at least partially based on a haze level in the RGB image and/or a reflection rate in the NIR image.

9. The method of claim 1, wherein the predefined cutoff depth is between 5 and 10 meters.

10. The method of claim 1, wherein the first NIR image layer is identical to the NIR image, and the RGB image is converted to the first and second RGB image layers via Laplacian decomposition, and wherein the fused image is reconstructed from the first combined image layer and the second RGB image layer.

11. The method of claim 1, wherein the second RGB image layer has a second resolution greater than the first resolution, and the depth map includes a first depth map, the method further comprising:
generating a second NIR image layer having the second resolution from the NIR image;
generating a second depth map having the second resolution;
generating a second combined image layer, including combining each pixel of the second NIR image layer and a corresponding pixel of the second RGB image layer based on a respective weight that is determined based on a depth value of a respective pixel of the second depth map and the predefined cutoff depth; and
wherein the fused image is reconstructed from the first combined image layer and the second combined image layer.

12. The method of claim 1, wherein the depth map includes a first depth map, the method further comprising:
generating a second NIR image layer having a second resolution from the NIR image, the second resolution being greater than the first resolution;
generating a second depth map having the second resolution;
generating a third RGB image layer having a third resolution from the RGB image; and
generating a second combined image layer, including combining each pixel of the second NIR image layer and a corresponding pixel of the second RGB image layer based on a respective weight that is determined based on a depth value of a respective pixel of the second depth map and the predefined cutoff depth;
wherein the fused image is reconstructed from the first combined image layer, the second combined image layer, and the third RGB image layer.

13. The method of claim 12, wherein the second NIR image layer is converted from the NIR image via Laplacian decomposition, and the first, second, and third RGB image layers are converted from the RGB image via Laplacian decomposition and form a Laplacian pyramid.

14. The method of claim 1, wherein generating the depth map having the first resolution further includes:
generating a depth image having a depth resolution from the RGB image; and
scaling the depth image having the depth resolution to the depth map having the first resolution.

15. The method of claim 14, further comprises:
training a deep learning model using training data, the deep learning model configured to generate depth information corresponding to pixels in a single RGB image;
scaling the RGB image based on an input requirement of the deep learning model;
generating the depth image using the scaled RGB image using the deep learning model.

16. The method of claim 1, wherein the depth map having the first resolution is generated from the RGB image and the NIR image using a stereo depth estimation model.

17. The method of claim 1, wherein the method is implemented by an electronic device having a camera, and obtaining the NIR image and RGB image further comprises:
capturing the RGB image and NIR image using a primary sensor and a secondary sensor of the camera, respectively, the RGB image having a resolution greater than that of the NIR image.

18. The method of claim 1, wherein the method is implemented at a server, and obtaining the NIR image and RGB image further comprises:
receiving from a client device the RGB and NIR images, wherein the client device is configured to capture the RGB and NIR image using a primary sensor and a secondary sensor of an electronic device, respectively, and the RGB image has a resolution greater than that of the NIR image.

19. A computer system, comprising:
one or more processors; and
memory having instructions stored thereon, which when executed by the one or more processors cause the processors to:

obtain a near infrared (NIR) image and an RGB image of a scene;
generate a first NIR image layer having a first resolution from the NIR image, and generate a first RGB image layer having the first resolution from the RGB image;
generate a depth map having the first resolution;
generate a first combined image layer, including combining each pixel of the first NIR image layer and a corresponding pixel of the first RGB image layer based on a respective weight that is determined based on a depth value of a respective pixel of the depth map and a predefined cutoff depth; and
reconstruct a fused image based on the first combined image layer.

20. A non-transitory computer-readable medium, having instructions stored thereon, which when executed by one or more processors cause the processors to:

obtain a near infrared (NIR) image and an RGB image of a scene, the NIR image having a first resolution;
generate a first RGB image layer and a second RGB image layer from the RGB image, the first RGB image layer having the first resolution, the second RGB image layer having a second resolution which is greater than the first resolution;
generate a depth map having the first resolution;
generate a first combined image layer, including combining each pixel of the first NIR image and a corresponding pixel of the first RGB image layer based on a respective weight that is determined based on a depth value of a respective pixel of the depth map and a predefined cutoff depth; and
reconstruct a fused image based on the first combined image layer and the second RGB image layer.

\* \* \* \* \*